United States Patent [19]
Stephens et al.

[11] 3,960,297
[45] June 1, 1976

[54] LIQUID MEASURING DEVICES

[75] Inventors: James B. Stephens, La Crescenta; Frank R. Anderson, Hacienda Heights, both of Calif.

[73] Assignee: Westates Space-Era Products, Inc., So. El Monte, Calif.

[22] Filed: June 24, 1974

[21] Appl. No.: 482,227

[52] U.S. Cl................................. 222/449; 222/453
[51] Int. Cl.².......................................... G01F 11/38
[58] Field of Search ........... 222/205, 335, 444, 453, 222/449–451

[56] References Cited
UNITED STATES PATENTS

| 370,613 | 9/1887 | Fifield et al..................... 222/444 X |
| 568,689 | 9/1896 | Kent ............................... 222/453 X |
| 586,689 | 9/1896 | Kent ............................... 222/453 X |
| 2,578,215 | 12/1951 | Wilson............................ 222/449 X |

*Primary Examiner*—Robert B. Reeves
*Assistant Examiner*—John P. Shannon
*Attorney, Agent, or Firm*—Edward D. O'Brian

[57] ABSTRACT

A liquid measuring device for use in dispensing a measured quantity of a liquid each time the pressure of liquid conveyed to such a device is reduced can be constructed utilizing associated inlet and outlet valves and an accumulator. The valves are constructed so that the inlet valve will be opened to the accumulator while the outlet valve is closed in response to an increase in the pressure of the liquid conveyed to the device. When the pressure of such supplied liquid is reduced as, for example, by the supply of liquid being cut off, the inlet valve is closed and the outlet valve is opened so as to discharge the liquid in the accumulator. Such devices are primarily intended for agricultural watering.

9 Claims, 7 Drawing Figures

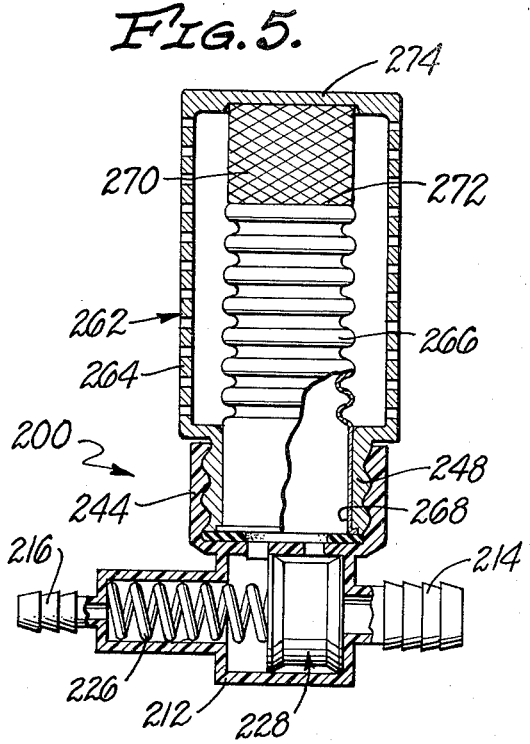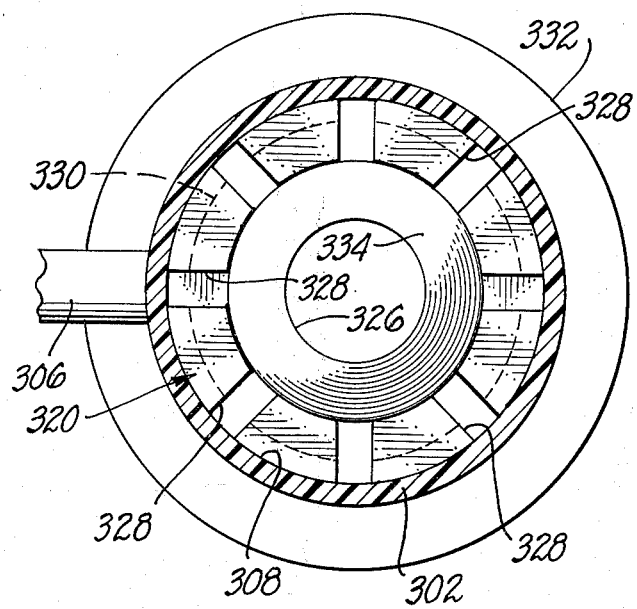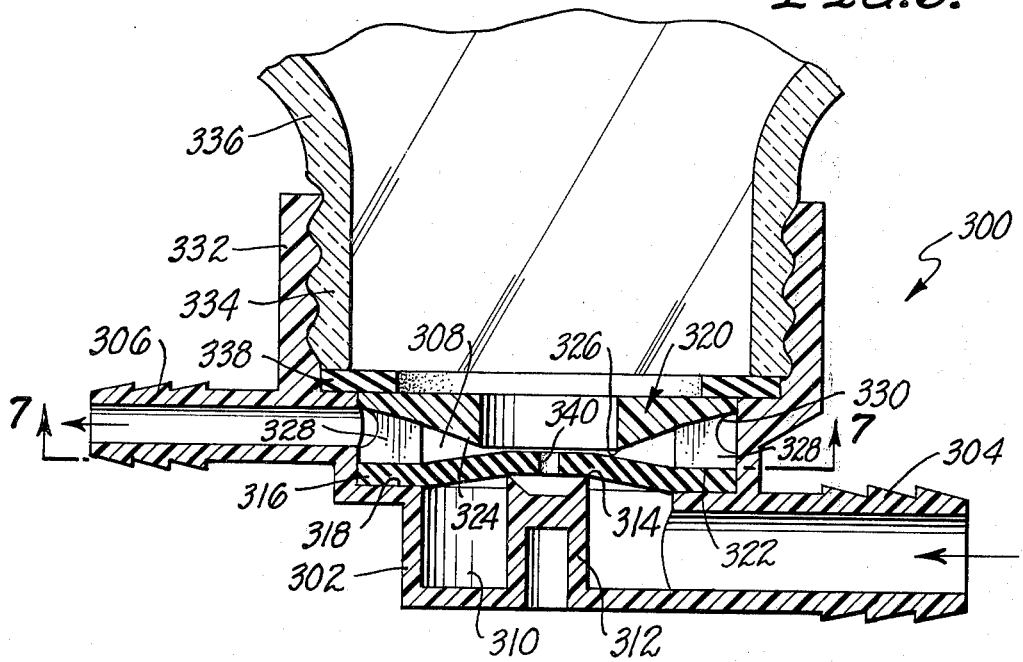

LIQUID MEASURING DEVICES

CROSS REFERENCE TO RELATED APPLICATIONS

Liquid measuring devices set forth in this specification are primarily intended to be utilized as indicated in the co-pending, commonly owned U.S. patent application, Ser. No. 482,372 filed June 24, 1974, now U.S. Pat. No. 3,900,135, entitled "Water Distribution System".

BACKGROUND OF THE INVENTION

The invention set forth in this specification pertains to liquid measuring devices for use in dispensing a measured quantity of liquid each time the pressure of the liquid conveyed to such a device is reduced. Such devices can be employed in dispensing liquids in a wide variety of different applications. It is presently considered, however, that devices as herein indicated will be and are primarily useful in agricultural watering.

As a consequence of the limitations of known irrigation procedures employing watering ditches, sprinklers and the like increasingly the agricultural industry is employing so-called "drip irrigation". In known drip irrigation procedures water is conveyed through appropriate conduits to means for dispensing water at a controlled rate. Such means frequently consist of discharge holes of a carefully controlled dimension. Normally such holes are used in conjunction with a separate means for reducing the pressure of the water reaching such a discharge orifice or hole such as a labyrinth path or an auxiliary conduit. It is also known to utilize various types of drip valves which will slowly dispense water as such water is supplied to them through a distribution conduit.

As nearly as is known all such drip irrigation procedures are of limited acceptability because they tend to dispense water in accordance with the water pressure at a particular dispensing location or orifice. This can result in uneven water pressure at various distances from where water is supplied to a conduit. It can also result in uneven watering if a drip irrigation system is installed so that a water distribution conduit is at various locations which are displaced vertically from one another as, for example, along a hilltop. This problem has been recognized and various measures have been proposed to remedy it. It has been proposed to vary the dimensions of discharge orifices along a distribution conduit so that the flow from each orifice is uniform. It has also been proposed to adjust successive discharge valves along the length of an irrigation conduit so as to achieve uniform flow rates. Various other expedients of a related character have been considered. Such expedients are not considered desirable for purely practical reasons. At the time a drip type irrigation system is manufactured it is normally impossible to know exactly how such a distribution will be used. Individual adjustments of a drip type irrigation system in a particular agricultural installation are relatively difficult and are definitely comparatively time consuming and expensive.

SUMMARY OF THE INVENTION

It is believed that it will be apparent from the preceding discussion that there is a need for new and improved irrigation type devices which may be utilized to dispense uniform quantities of water regardless of where such devices are located relative to one another or at different vertical locations. A broad objective of the present invention is to supply this need. The invention is also intended to supply liquid measuring devices which can be employed in dispensing measured quantities of liquids other than water wherever it is desired to utilize such devices.

The invention is also intended to provide liquid measuring devices as indicated which may be easily and conveniently constructed at a comparatively nominal cost, which are effective for their intended purpose or utilization, and which are capable of giving prolonged, reliable service with a minimum of maintenance. The invention is also intended to provide liquid measuring devices which can be utilized to supply different quantities of a liquid as desired. Normally such quantities will be determined by selecting the size of a part used with a device as herein indicated. However, it is possible to construct devices within the scope of this invention where such quantities may be manually adjusted or may be determined by ambient conditions such as, for example, the ambient moisture content of soil or the like.

In accordance with this invention these objectives are achieved by providing a liquid measuring device which includes: a housing having an inlet and an outlet, both of which are in communication with the interior of the housing, an accumulator means connected to the interior of the housing for storing liquid at approximately the pressure of liquid supplied to the inlet, an inlet valve means for controlling the flow of liquid into the housing associated with the inlet, an outlet valve means for controlling the flow of liquid from the housing associated with the outlet.

In accordance with this invention these valve means are preferably constructed so as to utilize a common valve member. In a measuring device in accordance with the invention both the valve means are capable of being opened and closed together in response to the pressure of liquid supplied to the inlet. The inlet valve means is open and the outlet valve means is closed when liquid is supplied to the inlet at an elevated pressure; the outlet valve means is open and the inlet valve means is closed when the liquid at the inlet is at a lower pressure. For satisfactory operation these valve means should be constructed so that at any supplied fluid pressure, one valve is open while the other is closed. The accumulator means is capable of receiving a quantity of liquid flowing into the housing when the inlet valve means is opened and is capable of discharging the liquid located in the accumulator means through the outlet valve means when this outlet valve means is opened.

BRIEF DESCRIPTION OF THE DRAWINGS

Additional details of liquid measuring devices in accordance with this invention and the manner of operating these devices as well as additional advantages of the invention will be apparent from a detailed consideration of the remainder of this specification, the appended claims, and the accompanying drawings in which:

FIG. 5 is a cross-sectional view similar to FIG. 2 of a further modified form of a liquid measuring device in accordance with this invention;

FIG. 6 is an additional cross-sectional view similar to FIG. 2 of a still further modified form of a liquid measuring device in accordance with this invention; and FIG. 7 is a partial cross-sectional view taken at line 7—7 of FIG. 6.

Figure 1:
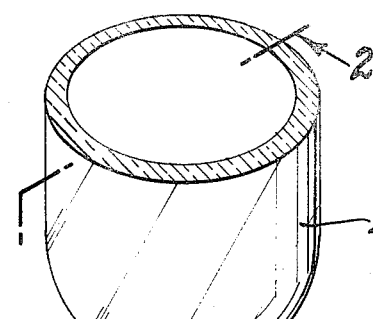
FIG. 1 is an isometric view of a presently preferred embodiment or form of a liquid measuring device in accordance with the invention.

The various structures illustrated in the drawings are constructed so as to utilize the concepts or features of the invention set forth and defined in the appended claims. Through the use or exercise of routine skill in the hydraulics field it is possible to utilize these concepts or features in a wide variety of somewhat differently appearing and somewhat differently constructed devices.

DETAILED DESCRIPTION

Figure 2:
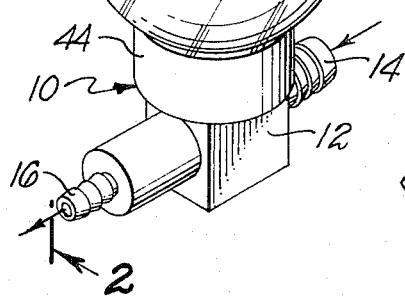
FIG. 2 is a cross-sectional view taken at line 2—2 of FIG. 1.

In FIGS. 1 and 2 of the drawing there is shown a liquid measuring device 10 in accordance with this invention which includes a centrally located housing 12 having a conventional inlet fitting 14 and a conventional outlet fitting 16. This inlet fitting 14 is adapted to be connected by a small lateral tube 18 to a principal tube or conduit (not shown) to be used for conveying liquid to the device 10 under pressure. A similar discharge tube 20 may, if desired, be connected to the outlet fitting 16 so as to convey liquid released by the device 10 to a desired location. In appropriate circumstances this tube 20 can, of course, be omitted. In other circumstances it may be desired to equip the tube 20 with various laterals (not shown) or known water diffusing devices.

Within the interior of the housing 12 there is a generally cylindrical chamber 22 which is axially aligned with the fittings 14 and 16. A cylindrical extension chamber 24 is preferably also axially aligned in this manner and is located between the chamber 22 and the outlet fitting 16. This chamber 24 acts as a retainer for a small coil spring 26 which serves to resiliently bias a valve member 28 so that when no liquid under pressure is applied to the inlet fitting 14 a face 30 of the valve member 28 fits against an end 32 of the chamber 22 serving as a valve seat. This, of course, closes off the inlet fitting 14.

When liquid under pressure is applied through the tube 18 the pressure of this liquid, if it is great enough to overcome the pressure of the spring 26, will move the valve member 28 along the length of the valve chamber 22 so that another face 34 of the valve member will fit against the other end 36 of the chamber 22 so as to close off the outlet fitting 16. It will be apparent from this that the end 36 serves as a valve seat. Preferably the valve member 28 is constructed as indicated so as to have sealing lips 38 around its faces 30 and 32 adjacent to the interior of the chamber 22. When it is constructed in this manner this valve member 28 serves essentially as a piston.

When pressure as indicated is applied through the tube 18 this valve member 28 will be moved to the left of the position shown in FIG. 2 so as to expose a communication port 40 to the interior of the chamber 22 and, hence, to liquid entering the device 10. A similar port 42 is located so as to be exposed to the interior of the chamber 22 when the pressure of the liquid at the inlet fitting 14 is so low the pressure of the spring 26 is not overcome, allowing this spring 26 to hold the valve member 28 in a position as shown in FIG. 2 of the drawing.

The housing 12 preferably includes an internally threaded fitting 44 which is adapted to receive a conventional hydraulic accumulator 46. This accumulator 46 may be constructed in any convenient, known manner. Many different accumulator constructions are known in the hydraulics field. It is presently preferred to utilize as the accumulator 46 within the device 10 what may be referred to as a common bottle having a neck 48 threaded within the fitting 44 against a sealing washer 50. When this type of accumulator 46 is used the device 10 should be vertically oriented as indicated in FIG. 2 of the drawing. An accumulator of this type is preferred because of simplicity. With the structure shown different accumulators 46 of different sizes as required for different liquid distributing applications may be conveniently substituted for one another.

It is believed that the manner of operation of the device 10 will be reasonably obvious from a consideration of the preceding. As liquid is applied to the device 10 through the inlet tube 18 under pressure the valve member 28 will be moved so as to permit this liquid to "charge" the accumulator 46 by trapping gas (normally air) in the accumulator 46. When the pressure of the liquid in the tube 18 is decreased to a sufficient extent the spring 26 will move the valve member 28 to a position as shown in FIG. 2. At this point the liquid contents of the accumulator 46 will flow through the port 42, the chamber 22, the chamber 24 and the outlet fitting 16. The quantity of water or other liquid delivered in this manner will be uniform each time the device 10 is used so as to receive liquid at a uniform pressure.

From a careful consideration of the device 10 it will be realized that the valve member 28 is, in effect, a common member or part used in two different, physically connected valves. The face 30 of the valve member 28 operates relative to the valve seat 32 so as to, in effect, serve as an inlet valve. Similarly the face or end 34 operates with respect to the end 36 serving as a valve seat of what may be referred to as an outlet valve. Because of the common function of the valve member 28 with respect to both of these valve structures the entire structure associated with the valve member 28 may be referred to as a double-acting valve.

This valve member 28 not only controls liquid flow into the device 10 and liquid flow out from the device 10 through the fittings 14 and 16. It also serves as a valve spool relative to the ports 40 and 42 so as to regulate the flow into and out of the accumulator 46 in such a manner that only one of the ports 40 or 42 can be opened at one time to either the inlet fitting 14 or the outlet fitting 16. This is considered to be important in preventing the valve member 28 from being located in an in between position in which liquid can flow completely through the device 10 without being held in the accumulator 46.

Figure 3:
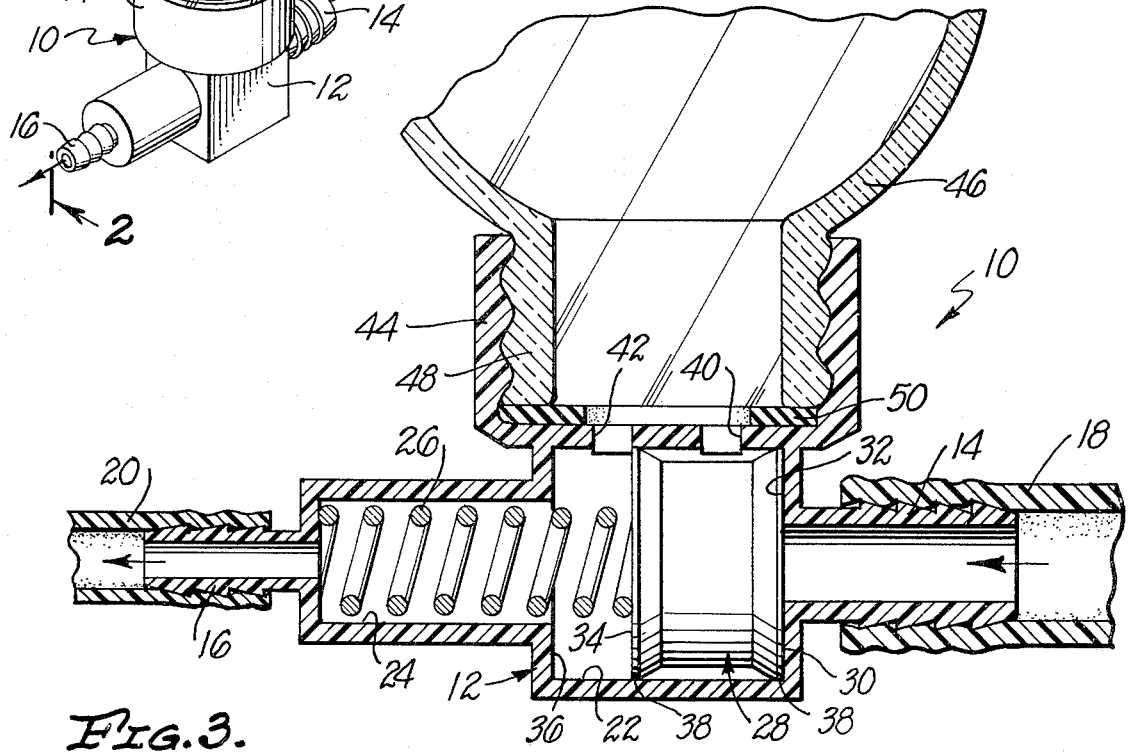
FIG. 3 is a cross-sectional view similar to FIG. 2 of a modified form of a liquid measuring device in accordance with this invention.
Figure 4:
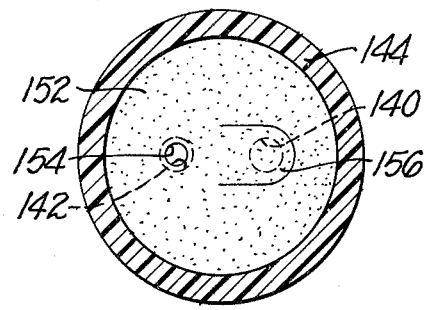
FIG. 4 is a cross-sectional view taken at line 4—4 of FIG. 3.

In FIG. 3 of the drawing there is shown a device 100 in accordance with this invention which is quite closely related to the device 10 previously described. In the interest of brevity all parts of the device 100 which are the same or nearly the same as corresponding parts of the device 10 are not separately indicated herein and are referred to in the drawing and in the remainder of this specification by numerals previously used to indicate such parts preceded by the numeral one.

In the device 100 an elastomeric member 152 replaces the washer 50 and serves the same function as this washer 50. This member 152, however, extends completely across the interior of the fitting 44. It is provided with a port 154 aligned with the port 142 and with a generally U-shaped flap 156 serving as a check valve member by fitting against a surface 158 in the bottom of the fitting 144 serving as a valve seat. If desired a small alignment flange 160 may be located around the port 142 so as to fit within the port 42 in order to hold the member 152 as indicated. Other equivalent alignment means can, of course, be employed.

The operation of the device 100 is essentially very similar to the operation of the device 10. When the device 100 is used and liquid is admitted into the accumulator 146 the flap 156 will flex so as to expose the port 140. When this device 100 is discharging liquid the flap 156 will move against the surface 158 in the manner of a common check valve, preventing back flow from the accumulator 146 through the inlet fitting 114 in the event the valve member 128 does not seat against the seat 132 so as to form a seal with it.

From this it will be realized that the device 100 differs from the device 10 primarily by the addition to the structure of the device 10 of a check valve structure serving to prevent reverse flow. The addition of such a check valve is desirable if there is any question about the operative character of the principal valve serving as both an inlet and an outlet valve. Different check valves than are indicated can be employed both internally of a device such as the device 10 and so as to be connected to an inlet fitting such as the fitting 14.

In FIG. 5 of the drawings there is shown still a further device 200 which is closely related to the previously described device 10. In the interest of brevity those parts of the device 200 which are the same or substantially the same as parts of the device 10 are not separately described herein and are indicated in the remainder of this specification and in the drawing by the numerals previously used to designate such parts preceded by the numeral two.

The device 200 differs from the device 10 previously described by the substitution of an accumulator 262 for the accumulator 46 previously described. This accumulator 262 has a perforate housing 264 terminating in a downwardly extending neck 248 which is adapted to be threaded into the fitting 244. Within the interior of the housing 264 there is located a bellows 266 having a centrally located opening 268 secured to the neck 248 so that liquid can move into and out of the bellows 266 during the operation of the device 200. A block 270 of a material which will expand and contract in accordance with the moisture contacting it is located between a top 272 on the bellows 266 and a top 274 of a housing 264.

This block 270 may be constructed or formed out of a wide variety of known materials including wood and various polymer materials such as are commonly referred to as "hydrogels". The function of the block 270 is to expand and contract in accordance with ambient moisture conditions so as to vary the effective internal volume of the bellows 266. Since with this structure the effective internal volume of the bellows 266 decreases as the ambient liquid content increases so as to expand the block 270 the device 200 can be used effectively in dispensing a measured quantity of water or other liquid in accordance with an ambient condition—specifically an ambient liquid concentration.

Using this generalized type of expedient it is possible to regulate a metered quantity of liquid which will be dispensed with a device such as the device 200 in accordance with any ambient parameter such as pressure and/or temperature which will cause expansion and/or contraction of a control member. Such control members can be bi-metal strips and the like as are known in the process control industry. This type of expedient can be employed with other accumulator structures such as structures using a rubber diaphragm instead of a metal bellows as indicated.

In FIG. 6 of the drawing there is shown a still further device 300 in accordance with this invention which is related to the device 10. This device 300 includes a housing 302 having an inlet fitting 304 and an outlet fitting 306 connected by what may be regarded as upper and lower internal chambers 308 and 310, respectively. These chambers 308 and 310 are both of a generally disc like shape. Within the center of the lower chamber 310 there is an upstanding boss 312 terminating in a circular upstanding sharp edge 314. An elastomeric diaphragm 316 is located against the bottom 318 of the upper chamber 308. The boss 312 extends sufficiently high so that the edge 314 projects into the upper chamber 308 to a sufficient extent to normally bear against this diaphragm 316 so that a seal is formed where the diaphragm 316 engages the edge 314.

This diaphragm 316 is held in place by a generally ring shaped retainer 320 located within the upper chamber 308 so that a lower surface 322 on this retainer 320 bears against the diaphram 316. The retainer 320 has an internally extending annular flange 324 carrying a downwardly extending circular edge 326. This edge 326 is normally spaced a short distance from the diaphragm 316 and is located outwardly from the edge 314. Notches 328 in the surface 322 place the lower surface of the retainer 320 outside of the edge 326 in communication with an annular groove 330 which extends completely around the exterior of the retainer 320. This groove 330 is located so as to be exposed to the outlet fitting 306.

The housing 302 also carries an upwardly extending internally threaded skirt 332 which is adapted to receive a threaded neck 334 on an inverted bottle accumulator 336. A small washer 338 may be located between the neck and the retainer 320 for the obvious purposes. Various accumulators as are indicated in the preceding discussion may, of course, be employed as the accumulator 336.

The operation of the device 300 is essentially very similar to the operation of the device 10. As liquid under pressure is applied to the inlet fitting 304 this pressure will act against the diaphragm 316, moving this diaphragm off of the edge 314 into contact with the edge 326. Such liquid under pressure will flow past the edge 314 through a centrally located hole 340 into the accumulator 336 at the same time that the accumulator 336 is sealed off from the outlet fitting 306 by the diaphragm 316 fitting against or abutting the edge 326. When the inlet pressure is reduced to a sufficient extent so as to no longer deform the diaphragm 316 this diaphragm 316 will return to its original position, seating against the edge 314. This will permit the liquid charged in the accumulator 336 to flow past the edge 326 through the notches 328 and the groove 330 to the outlet fitting 306.

From a consideration of this device 300 it will be realized that it also employs what may be regarded as two separate yet interconnected valves constituting a double acting valve unit. The diaphragm 316 serves as a valve member seating against the edge 314 so as to serve as an inlet valve while this same diaphragm 316 seats against the edge 326 so as to serve as an outlet valve. These edges 314 and 320 may be regarded as valve seats.

For the device to be effective the dimensions are chosen so that only mininum flexure of the diaphragm 316 is required in operating the structure and so that both the inlet and the outlet are not closed off at the same time and are not apt to be in fluid communication. In a sense the diaphragm 316 may be regarded as a biasing means since its inherent resiliency is used to normally bias or hold it in a position as indicated in FIG. 6.

We claim:

1. A liquid measuring device which comprises:
   a housing having an inlet and an outlet, said inlet and said outlet being in communication with the interior of said housing,
   accumulator means including a completely enclosed vessel for storing liquid at approximately the pressure of liquid supplied to said inlet, the interior of said vessel being closed off from the exterior of said vessel, said accumulator means being connected to the interior of said housing,
   inlet valve means for controlling the flow of liquid into said housing associated with said inlet,
   outlet valve means for controlling the flow of liquid from said housing associated with said outlet,
   both of said valve means are capable of being opened and closed in response to the pressure of liquid supplied to said inlet, said inlet valve means being opened and said outlet valve means being closed when liquid is supplied to said inlet at an elevated pressure, said outlet valve means being open and said inlet valve means being closed when the liquid at said inlet is at a lower pressure,
   said accumulator means being capable of receiving liquid flowing into said housing through said inlet valve means when said inlet valve means is open and being capable of discharging liquid located therein through said outlet valve means when said outlet valve means is open.

2. A liquid measuring device as claimed in claim 1 wherein:
   said inlet and said outlet valve means are connected so that neither of said valve means can be opened when the other is opened.

3. A liquid measuring device as claimed in claim 1 wherein:
   said inlet valve means has an inlet valve seat and said outlet valve means has an outlet valve seat,
   said inlet and outlet valve means have a common valve member which during the operation of said liquid measuring device is moved relative to said inlet valve seat and relative to said outlet valve seat, said valve member being capable of seating against either of said valve seats.

4. A liquid measuring device as claimed in claim 1 wherein:
   said accumulator means is constructed so that said volume can be varied.

5. A liquid measuring device which comprises:
   a housing having an inlet and an outlet, said inlet and said outlet being in communication with the interior of said housing,
   accumulator means for storing liquid at approximately the pressure of liquid supplied to said inlet, said accumulator means being connected to the interior of said housing,
   inlet valve means for controlling the flow of liquid into said housing associated with said inlet,
   outlet valve means for controlling the flow of liquid from said housing associated with said outlet,
   both of said valve means are capable of being opened and closed in response to the pressure of liquid supplied to said inlet, said inlet valve means being opened and said outlet valve means being closed when liquid is supplied to said inlet at an elevated pressure, said outlet valve means being open and said inlet valve means being closed when the liquid at said inlet is at a lower pressure,
   said accumulator means being capable of receiving liquid flowing into said housing through said inlet valve means when said inlet valve means is open and being capable of discharging liquid located therein through said outlet valve means when said outlet valve means is open,
   check valve means for preventing the flow of liquid from said accumulator means through said inlet.

6. A liquid measuring device which comprises:
   a housing having an inlet and an outlet, said inlet and said outlet being in communication with the interior of said housing,
   accumulator means for storing liquid at approximately the pressure of liquid supplied to said inlet, said accumulator means being connected to the interior of said housing,
   inlet valve means for controlling the flow of liquid into said housing associated with said inlet,
   outlet valve means for controlling the flow of liquid from said housing associated with said outlet,
   both of said valve means being capable of being opened and closed in response to the pressure of liquid supplied to said inlet, said inlet valve means being opened and said outlet valve means being closed when liquid is supplied to said inlet at an elevated pressure, said outlet valve means being open and said inlet valve means being closed when the liquid at said inlet is at a lower pressure,
   said accumulator means being capable of receiving liquid flowing into said housing through said inlet valve means when said inlet valve means is open and being capable of discharging liquid located therein through said outlet valve means when said outlet valve means is open,
   fluid sensitive means for varying the capacity of said accumulator means in accordance with the ambient liquid concentration around the exterior of said accumulator means.

7. A liquid measuring device which comprises:
   a housing having an inlet and an outlet, said inlet and said outlet being in communication with the interior of said housing,
   accumulator means for storing liquid at approximately the pressure of liquid supplied to said inlet, said accumulator means being connected to the interior of said housing,
   inlet valve means for controlling the flow of liquid into said housing associated with said inlet, outlet valve means for controlling the flow of liquid from said housing associated with said outlet, both of said valve means are capable of being opened and closed in response to the pressure of liquid supplied to said inlet, said inlet valve means being opened and said outlet valve means being closed when liquid is supplied to said inlet at an elevated pressure, said outlet valve means being open and said inlet valve means being closed when the liquid at said inlet is at a lower pressure, said accumulator means being capable of receiving liquid flowing into said housing through said inlet valve means when said inlet valve means is open and being capable of discharging liquid located therein through said outlet valve means when said outlet valve means is open, said inlet valve means having an inlet valve seat and said outlet valve means having an outlet valve seat, said inlet and outlet valve means have a common valve member which during the operation of said liquid measuring device is moved relative to said inlet valve seat and relative to said outlet valve seat, said valve member being capable of seating against either of said valve seats, said common valve member has an elastomeric member having an opening extending therethrough, said inlet valve seat is a ridge extending around said opening on one side of said member, said outlet valve seat is a ridge extending around said opening on the other side of said member, said common valve member is capable of being moved by liquid supplied to said inlet at an elevated pressure away from said inlet valve seat and against said outlet valve seat, said member is capable of automatically moving away from said outlet valve seat against said inlet valve seat when liquid is supplied to said inlet at a lower pressure.

8. A liquid measuring device which comprises:

a housing having an inlet and an outlet, said inlet and said outlet being in communication with the interior of said housing, accumulator means for storing liquid at approximately the pressure of liquid supplied to said inlet, said accumulator means being connected to the interior of said housing, inlet valve means for controlling the flow of liquid into said housing associated with said inlet, outlet valve means for controlling the flow of liquid from said housing associated with said outlet, both of said valve means being capable of being opened and closed in response to the pressure of liquid supplied to said inlet, said inlet valve means being opened and said outlet valve means being closed when liquid is supplied to said inlet at an elevated pressure, said outlet valve means being open and said inlet valve means being closed when the liquid at said inlet is at a lower pressure, said accumulator means being capable of receiving liquid flowing into said housing through said inlet valve means when said inlet valve means is open and being capable of discharging liquid located therein through said outlet valve means when said outlet valve means is open, said inlet valve means having an inlet valve seat and said outlet valve means having an outlet valve seat, said inlet and outlet valve means have a common valve member which during the operation of said liquid measuring device is moved relative to said inlet valve seat and relative to said outlet valve seat, said valve member being capable of seating against either of said valve seats, spring means normally biasing said valve member against said inlet valve seat, check valve means located so as to prevent the flow of liquid from within said accumulator means out through said inlet in the event said valve member does not seat against said inlet valve seat.

9. A liquid measuring device which comprises:

a housing having an inlet and an outlet, said inlet and said outlet being in communication with the interior of said housing, accumulator means for storing liquid at approximately the pressure of liquid supplied to said inlet, said accumulator means being connected to the interior of said housing, inlet valve means for controlling the flow of liquid into said housing associated with said inlet, outlet valve means for controlling the flow of liquid from said housing associated with said outlet, both of said valve means being capable of being opened and closed in response to the pressure of liquid supplied to said inlet, said inlet valve means being opened and said outlet valve means being closed when liquid is is supplied to said inlet at an elevated pressure, said outlet valve means being open and said inlet valve means being closed when the liquid at said inlet is at a lower pressure, said accumulator means being capable of receiving liquid flowing into said housing through said inlet valve means when said inlet valve means is open and being capable of discharging liquid located therein through said outlet valve means when said outlet valve means is open, said inlet valve means having an inlet valve seat and said outlet valve means having an outlet valve seat, said inlet and outlet valve means have a common valve member which during the operation of said liquid measuring device is moved relative to said inlet valve seat and relative to said outlet valve seat, said valve member being capable of seating against either of said valve seats, said inlet valve means including a communication port connecting said inlet valve means and said accumulator means, said outlet valve means including a communication port connecting said outlet valve means and said accumulator means, said valve member being capable of being physically located in a position against said inlet valve seat in which said first communication port is sealed off from said inlet and said second communication port is open to said outlet and said valve member is capable of being physically located in a position against said outlet valve seat in which said first communication port is open to said inlet and said second communication port is sealed off from said outlet, said valve member and said communication ports being dimensioned so that the interior of said accumulator means is incapable of being in communication with both said inlet and said outlet at the same time, and including spring means normally biasing said valve member against said inlet valve seat.

* * * * *